(12) United States Patent
Parkman

(10) Patent No.: US 7,450,901 B2
(45) Date of Patent: Nov. 11, 2008

(54) METHODS AND APPARATUS FOR PATH DISCOVERY BETWEEN A MOBILE PLATFORM AND A GROUND SEGMENT

(75) Inventor: David S. Parkman, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 1603 days.

(21) Appl. No.: 10/171,010

(22) Filed: Jun. 12, 2002

(65) Prior Publication Data

US 2002/0152468 A1 Oct. 17, 2002

Related U.S. Application Data

(60) Provisional application No. 60/318,735, filed on Sep. 12, 2001.

(51) Int. Cl.
*H04B 7/185* (2006.01)
(52) U.S. Cl. .............. 455/12.1; 455/427; 455/3.01; 455/431
(58) Field of Classification Search ............... 455/12.1, 455/13.1, 13.2, 41.2, 524, 526, 67.15, 77, 455/80, 552.1, 124, 3.01, 3.02, 3.03, 431, 455/445, 423, 427
See application file for complete search history.

(56) References Cited

U.S. PATENT DOCUMENTS

| | | | |
|---|---|---|---|
| 4,654,879 A * | 3/1987 | Goldman et al. ............. 455/440 |
| 5,249,303 A * | 9/1993 | Goeken ....................... 455/431 |
| 5,463,656 A * | 10/1995 | Polivka et al. .............. 375/130 |
| 5,761,602 A * | 6/1998 | Wagner et al. ................ 725/34 |
| 5,896,558 A * | 4/1999 | Wiedeman ................... 455/12.1 |
| 5,901,342 A * | 5/1999 | Heiskari et al. ............. 455/11.1 |
| 5,931,877 A * | 8/1999 | Smith et al. .................... 701/29 |
| 6,285,878 B1* | 9/2001 | Lai ............................... 455/431 |
| 6,339,707 B1* | 1/2002 | Wainfan et al. .............. 455/427 |
| 6,529,706 B1* | 3/2003 | Mitchell ..................... 455/12.1 |
| 6,591,084 B1* | 7/2003 | Chuprun et al. ............ 455/3.05 |
| 6,741,841 B1* | 5/2004 | Mitchell .................. 455/188.1 |

FOREIGN PATENT DOCUMENTS

| EP | 0 980 192 A1 | 2/2000 |
|---|---|---|
| EP | 1 096 699 A2 | 5/2001 |

OTHER PUBLICATIONS

WO 98/26521 filed Dec. 9, 1997.
WO 01/24408 A2; filed Sep. 21, 2000.
WO 01/024408 A3; filed Sep. 21, 2000.

* cited by examiner

*Primary Examiner*—Tan Trinh
(74) *Attorney, Agent, or Firm*—Harness, Dickey & Pierce, P.L.C.

(57) ABSTRACT

A method for discovering a data routing path via satellite link to a mobile platform from a ground segment of a communications network. The mobile platform and ground segment communicate via satellite transponder. Each transponder has a dedicated ground segment equipment chain. A unique path signature is assigned to each chain. The ground segment multicasts, via the chain(s), message(s) containing the path signature corresponding to the chain(s). The platform transmits, to the ground segment, path signature(s) received by the platform via the message(s). The ground segment maintains information for controlling path discovery. Thus misrouting due to differences in transponder path identification is eliminated.

20 Claims, 3 Drawing Sheets

METHODS AND APPARATUS FOR PATH DISCOVERY BETWEEN A MOBILE PLATFORM AND A GROUND SEGMENT

CROSS-REFERENCE TO RELATED APPLICATIONS

This application claims priority from U.S. provisional application Ser. No. 60/318,735, filed Sep. 12, 2001, the disclosure of which is incorporated herein by reference in its entirety.

FIELD OF THE INVENTION

The present invention relates generally to transmitting data content over networked computer systems and more particularly to discovering paths for routing data and video content from a ground segment to a mobile platform via satellite link.

BACKGROUND OF THE INVENTION

Broadband data and video services have not been widely available to users on mobile platforms such as aircraft, boats, trains, and automobiles. Network systems have traditionally been limited in bandwidth and link capacity, making it prohibitively expensive and/or unacceptably slow to distribute such services to all passengers on a mobile platform. Certain limited services are available to provide video programming to a mobile platform. For example, one service provides either TV broadcast services from available direct broadcast signals (i.e. Echostar® and DirecTV®) or provides a custom TV broadcast signal through dedicated satellite links (i.e. Airshow®).

Limited Internet access also is currently available to a user on a mobile platform. For example, a narrow-bandwidth Internet connection is available via a standard computer telephone modem between a user's computer and the air-ground or ship-shore telephony system. Another service is anticipated to provide world-wide-web content to users on a mobile platform. The web content, however, is pre-stored on a server located on the mobile platform and is updated while the platform is in an inactive mode, for example, when an aircraft is parked at an airport gate or when a ship is docked at a port.

A system described in co-pending U.S. patent application Ser. No. 09/639,912 provides bi-directional data services and live television programming to mobile platforms. Data content is transferred via satellite communications link between a ground-based control segment and a mobile RF transceiver system carried on each mobile platform. Each user on each mobile platform is able, using a laptop, personal digital assistant (PDA) or other computing device, to interface with an on-board server. Each user can independently request and obtain, for example, Internet access, company intranet access and live television programming. Real-time programming is supplied, for example, by Direct Broadcast Satellite (DBS) service providers such as Echostar® and DirecTV®. The content is kept fresh by periodic updates from at least one ground-based server.

As on-board users make various requests for data content and network access while a mobile platform travels, it is necessary for the above system to determine how to transmit data content to the platform from the ground segment. More specifically, as a platform travels through a satellite coverage region, it intermittently initiates and terminates two-way communication links with the ground segment via satellite. Each time a two-way link is established between the ground segment and the platform, a data routing path to the platform must be discovered. That is, the above system must determine how to route data packets to the platform in such a way that data content is properly sequenced and reassembled when it reaches its destination. Additionally, when the moving platform terminates a two-way link with the ground segment, any such routing paths are allowed to expire from the system routing tables and thus are removed from the system to prevent attempts to transmit data via the terminated link. Therefore, each time a new two-way communication link is established with a mobile platform, the system must discover a new data routing path to the mobile platform before data content can be transmitted to the platform.

It is desirable to provide multiple data routing paths to a platform, in order to provide push services to the platform and to increase efficiency of data transfer through use of techniques such as statistical multiplexing. When a platform can establish links via more than one transponder, however, it becomes increasingly possible for the system to misroute data to expired or invalid paths.

SUMMARY OF THE INVENTION

In one preferred form, the present invention provides a method for discovering a data routing path via satellite link to a mobile platform from a ground segment of a communications network. The mobile platform and the ground segment are configured to communicate via at least one of a plurality of satellite transponders. Each transponder has a dedicated ground segment equipment chain. A unique path signature is assigned to each of the plurality of transponder equipment chains. The ground segment multicasts, via at least one of the transponder equipment chains, at least one message containing the path signature corresponding to the at least one transponder equipment chain. The platform transmits, to the ground segment, at least one path signature received by the platform via the message(s).

The above method provides for ground segment maintenance of information used to control path discovery for a coverage region. Thus misrouting due to differences in transponder path identification by a mobile platform and by the ground segment is eliminated. This method also allows statistical multiplexing to be performed to increase efficiency of bandwidth use.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
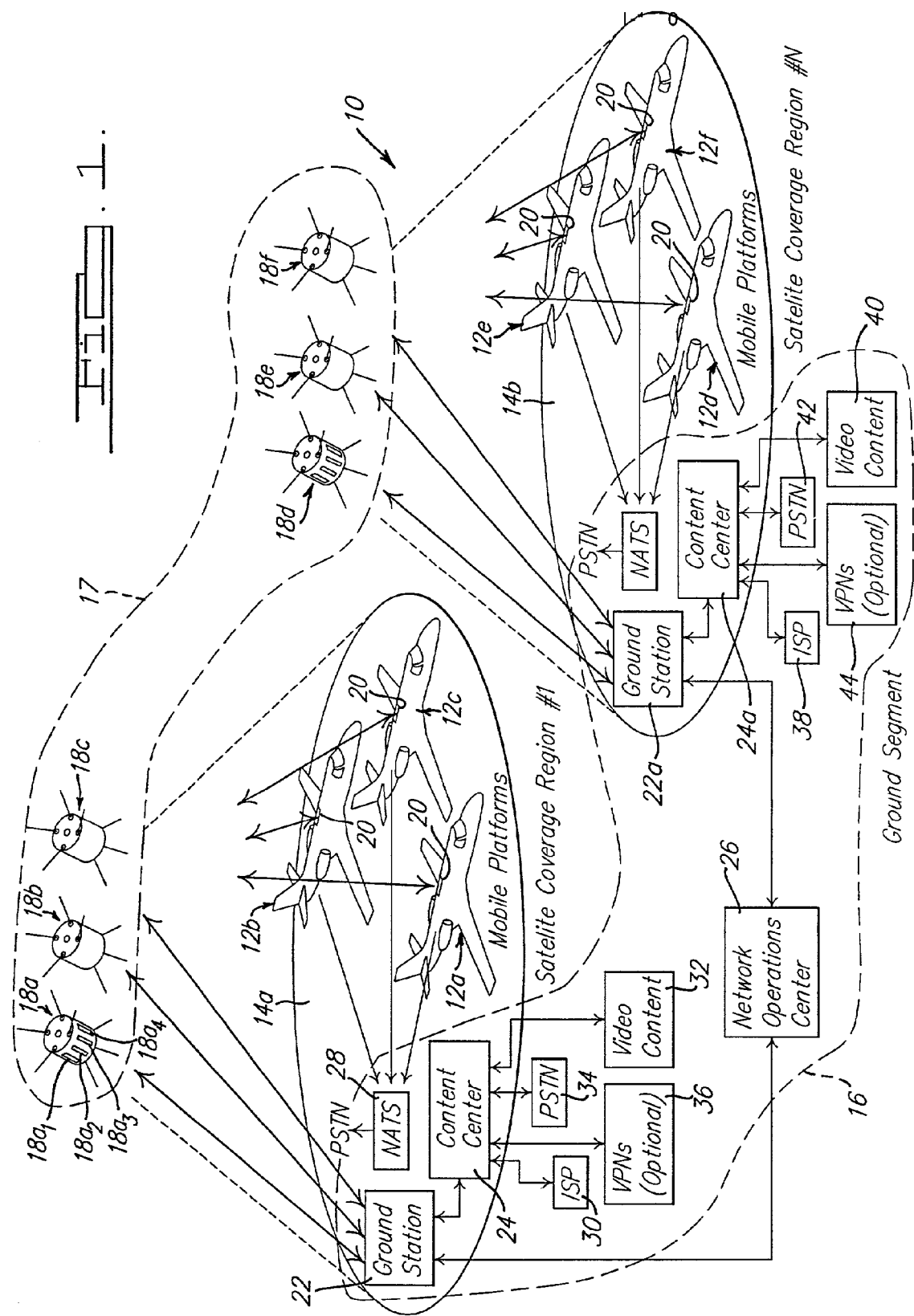
FIG. 1 is a simplified block diagram illustrating a system for providing bi-directional data services and live television programming to mobile platforms.

A system in accordance with a preferred embodiment of the present invention is generally indicated in FIG. 1 by reference numeral 10. The system 10 provides bi-directional data services and live television programming to mobile platforms 12a-12f in one or more coverage regions 14a and 14b. The system 10 includes a ground-based segment 16, a plurality of orbiting satellites 18a-18f, and a mobile communications system 20 disposed on each moving platform 12. Each mobile system 20 is in bi-directional communication with at least one of the satellites 18.

As described below, the present invention in one embodiment is directed to a method for discovering a data routing path from a ground segment to a mobile platform via satellite link. The mobile platforms could include aircraft, cruise ships or any other mobile vehicle. Thus the illustration of the mobile platforms 12 as aircraft herein, and the reference to the mobile platforms as aircraft throughout the following description, should not be construed as limiting the applicability of the system 10 and/or the present invention to only aircraft.

The system 10 may include any number of satellites 18 in each coverage region 14a and 14b needed to provide coverage for each region. Satellites 18a, 18b, 18d and 18e are preferably Ku- or Ka-band satellites. Satellites 18c and 18f are Broadcast Satellite Services (BSS) satellites. Each of the satellites 18 is further located in a geostationary orbit (GSO) or a non-geostationary orbit (NGSO). Examples of NGSO orbits include low Earth orbit (LEO), medium Earth orbit (MEO) and highly elliptical orbit (HEO). Each of the satellites 18 includes at least one radio frequency (RF) transponder. Satellite 18a, for example, is illustrated as having four transponders $18a_1$-$18a_4$. Each other satellite 18 illustrated could have a greater or lesser number of RF transponders for handling the anticipated number of mobile platforms 12 operating in the associated satellite coverage area 14. The transponders provide "bent-pipe" communications between the aircraft 12 and the ground segment 16. The frequency bands used for these communication links could include any radio frequency band from approximately 10 MHz to 100 GHz.

The transponders preferably include Ku-band transponders in the frequency band designated by the Federal Communications Commission (FCC) and the International Telecommunications Union (ITU) for Fixed Satellite Services (FSS) or BSS satellites. Also, different types of transponders may be used (i.e., each satellite 18 need not include a plurality of identical types of transponders) and each transponder may operate at a different frequency. Each of the transponders $18a_1$-$18a_4$ further includes wide geographic coverage, high effective isotropic radiated power (EIRP) and high gain/noise temperature (G/T).

The ground segment 16 includes one or more ground stations 22, e.g. stations 22a and 22b as shown in FIG. 1, in bi-directional communication with at least one of the satellites 18. Each ground station 22 also is in bi-directional communication with an associated content center 24. Each ground station 22 also is in bi-directional communication with a network operations center (NOC) 26 via a terrestrial ground link or other suitable communication link. An optional air telephone system 28, e.g. the National Air Telephone System (NATS), may provide a return link from a mobile platform 12 alternative to that provided by the satellites 18. Each ground station 22 may be located anywhere within its associated coverage region 14.

Referring to coverage area 14a, the ground station 22a includes an antenna and associated antenna control electronics for transmitting data content to the satellites 18a and 18b. The antenna of the ground station 22a may also be used to receive data content transponded by the transponders $18a_1$-$18a_4$ originating from each mobile system 20 of each aircraft 12 within the coverage region 14a.

The content center 24 in each coverage region 14 is in communication with a variety of external data content providers and controls the transmission of video and data information received by it to the associated ground station 22. The content center 24a is in contact, for example, with an Internet service provider (ISP) 30, a video content source 32 and a public switched telephone network (PSTN) 34. Optionally, the content center 24a can also communicate with one or more virtual private networks (VPNS) 36. The ISP 30 provides Internet access to each of the occupants of each aircraft 12a-12c. The video content source 32 provides live television programming, for example, Cable News Network® (CNN) and ESPN®. The NOC 26 performs traditional network management, user authentication, accounting, customer service and billing tasks. The content center 24b associated with the ground station 22b in the coverage region 14b is in communication with an ISP 38, a video content provider 40, a PSTN 42, and a VPN 44. An air telephone system 28 also may be included as an alternative to the satellite return link.

Figure 2:
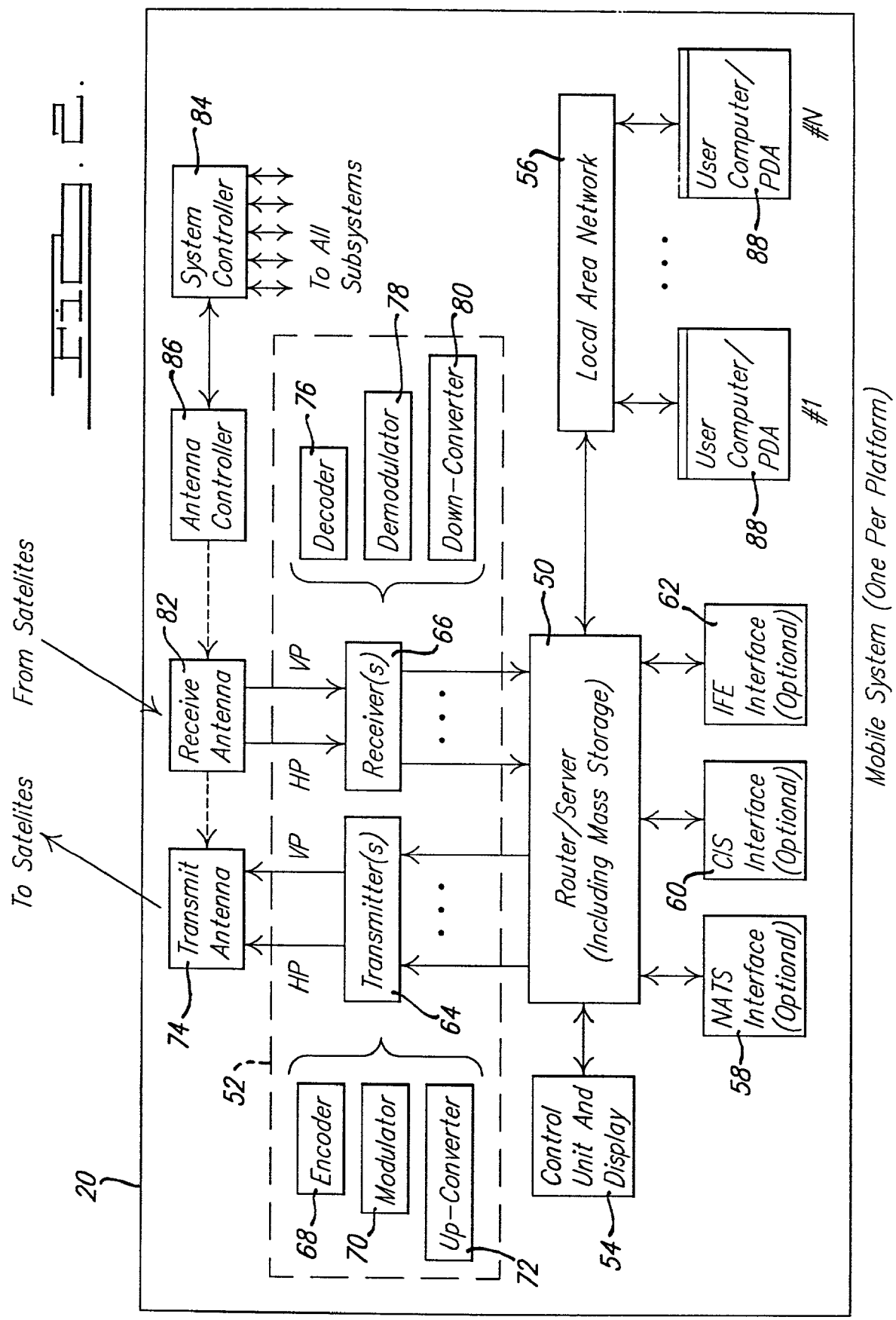
FIG. 2 is a simplified block diagram of a mobile system carried on each mobile platform.

The mobile system 20 disposed on each aircraft 12 is shown in FIG. 2 and shall be discussed with reference to the aircraft 12a. The mobile system 20 includes a data content management system in the form of a router/server 50 (hereinafter "server"). The server 50 is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an up-converter 72 for encoding, modulating, and up-converting data content signals from the server 50 to a transmit antenna 74. The receiver subsystem 66 includes a decoder 76, a demodulator 78 and a down-converter 80 for decoding, demodulating and down-converting signals received by a receive antenna 82 into baseband video and audio signals, as well as data signals. While only one receiver subsystem 66 is shown, a plurality of receiver subsystems 66, and a corresponding plurality of components 76-80, typically are included to enable simultaneous reception of RF signals from a plurality of RF transponders.

The signals received by the receiver subsystem 66 are input to the server 50. A system controller 84 is used to control all subsystems of the mobile system 20. The system controller 84 provides signals to an antenna controller 86 which is used to electronically steer the receive antenna 82 to maintain the receive antenna 82 pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In such case the transmit antenna 74 and the receive antenna 82 are combined into a single antenna.

The local area network (LAN) 56 is used to interface the server 50 to a plurality of access stations 88 associated with each seat location on board the aircraft 12*a*. Each access station 88 can be used to provide direct two-way communication between the server 50 and a user's laptop computer, personal digital assistant (PDA) or other personal computing device of the user. The access stations 88 could also each include a seat-back-mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12*a*. The receive and transmit antennas 82 and 74, respectively, may include any form of steerable antenna, including electronically scanned, phased array antennas.

Referring further to FIG. 1, in the operation of the system 10, data content is formatted into Internet Protocol (IP) packets before being transmitted either by a ground station 22 (hereinafter referred to as a "forward link" transmission) or from the transmit antenna 74 of each mobile system 20. IP packet multiplexing also is employed such that data content can be provided simultaneously to each of the aircraft 12 operating, for example, within the coverage region 14*a* using unicast, multicast and broadcast transmissions. The IP packets received by each of the transponders $18a_1$-$18a_4$ are transponded by the transponders to each aircraft 12 operating within the coverage region 14*a*.

The receive antenna 82 and transmit antenna 74 are each disposed on the top of the fuselage of their associated aircraft 12. The receive antenna 82 of each aircraft 12 receives the entire RF transmission of encoded RF signals representing the IP data content packets from at least one of the transponders $18a_1$-$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$-$18a_4$ carried by the target satellite 18 to which it is pointed. The receiver 66 decodes, demodulates and down-converts the encoded RF signals to produce video and audio signals, as well as data signals, that are input to the server 50.

As further described below, the server 50 operates to filter off and drop any data content not intended for users on the aircraft 18 and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12*a*.

The system 10 is also capable of receiving Direct Broadcast Satellite (DBS) transmissions of live television programming, for example, programming provided by DirecTV® and Echostar®. DBS transmissions occur in a frequency band designated for broadcast satellite services (BSS) and are typically circularly polarized in North America. The FSS frequency band that carries the data services and the BSS frequency band that carries DBS transmissions are adjacent to each other in the Ku-band. Thus a single Ku-band receive antenna can be used to receive either DBS transmissions from DBS satellites 18*c* and 18*f* in the BSS band or data services in the FSS band from one of the FSS satellites 18*a* or 18*b*, or both simultaneously using the same receive antenna 82. Simultaneous reception from multiple satellites 18 is accomplished using a multi-beam antenna 82 with satellites co-located in the same geostationary orbit slot.

Rebroadcast television or customized video services are received and processed in the same way. Referring for example to the coverage area 14*a*, rebroadcast television or customized video content is obtained from the video content source 32 and transmitted via the ground station 22*a* to the FSS satellites 18*a* and 18*b*. The video content is encoded for transmission by the content center 24*a* before being broadcast by the ground station 22*a*. Some customization of the rebroadcast content may occur on the server 50 (FIG. 2) of the mobile system 20 to tailor advertisements and other information content to a particular market or interest of the users on the aircraft 12.

The bulk of data content provided to the users on each aircraft 12 is provided by using a private portal data content. This content is implemented as a set of HTML pages housed on the server 50 of each mobile system 20. The content is kept fresh by periodic updates from a ground-based server located in content center 24*a*, and in accordance with a scheduling function controlled by the NOC 26 of the ground segment 16. The server 50 may be configured to accept user log-on information and to keep track of user and network accounting information to support a billing system under control of the NOC 26.

The system 10 also provides direct Internet connectivity via satellite links, for example, when a user on board an aircraft 12 desires to obtain data content that is not cached on the on-board server 50, or as an avenue for content sources to provide fresh content for the private portals. Refreshing of the cached content of the portal may be accomplished, for example, by in-flight, periodic "pushed" cache refresh over the satellite links.

Referring further to FIGS. 1 and 2, a transmission of data content from the aircraft 12*a* to the ground station 22*a* will be described. This transmission is termed a "return link" transmission. The antenna controller 86 causes the transmit antenna 74 to maintain the antenna beam thereof pointed at the target satellite 18*a*. The channels used for communication from each mobile system 20 back to a ground station 22 represent point-to-point links that are individually assigned and dynamically managed by the NOC 26 of the ground segment 16. When the system 10 is to accommodate several hundred or more aircraft, multiple aircraft are assigned to each transponder carried by a given satellite 18.

The receive antenna 82 may implement a closed-loop tracking system for pointing the antenna beam and for adjusting the polarization of the antennas based on receive signal amplitude. The transmit antenna 74 is preferably slaved to the point direction and polarization of the receive antenna 82. Alternatively, an open-loop tracking method may be used with the pointing direction and polarization determined by knowledge of mobile platform position and attitude using an on-board inertial reference unit (IRU) and knowledge of the location of the satellites 18.

Encoded RF signals are transmitted from the transmit antenna 74 of the mobile system 20 of a given aircraft 12 to an assigned one of the transponders $18a_1$-$18a_4$, and transponded by the designated transponder to the ground station 22. The ground station 22 communicates with the content center 24 to determine and provide the data being requested by the user (e.g. content from the world-wide web, email or information from the user's VPN).

The aperture size of a receive antenna 82 typically is smaller than that of conventional "very small aperture terminal" (VSAT) antennas. Accordingly, the beam from the receive antenna 82 might encompass adjacent satellites along the geo-synchronous arc, resulting in interference being received by a particular mobile system 20 from satellites other than the target satellite. Thus the system 10 uses a lower than normal forward link data rate to overcome such interference. For example, the system 10 operates at a forward link data rate of about 5 Mbps per transponder, using a typical FSS Ku-band transponder (e.g. Telstar-6) and an antenna having an active aperture of about 17 inches by 24 inches (43.18 cm by 60.96 cm). For comparison purposes, a typical Ku-band transponder usually operates at a data rate of approximately 30 Mbps using conventional VSAT antennas.

Using a standard digital video broadcast (DVB) waveform, the forward link signal typically occupies less than 8 MHz out of a total transponder width of 27 MHz. FCC regulations, however, presently regulate the maximum effective isotropic radiated power (EIRP) spectral density from a transponder to prevent interference between closely spaced satellites. Accordingly, spread-spectrum modulation techniques can be used in modulator 70 to "spread" the forward link signal over the transponder bandwidth using well-known signal spreading techniques. Spectral density of the transponded signal is reduced, and thus the possibility of interference between two or more mobile systems 20 is eliminated. Spread-spectrum modulation techniques also can be used on return link transmissions, so that the signal transmitted by a transmit antenna 74 is spread below the threshold EIRP spectral density at which the signal would cause interference to satellites adjacent to the target satellite 18.

Figure 3:
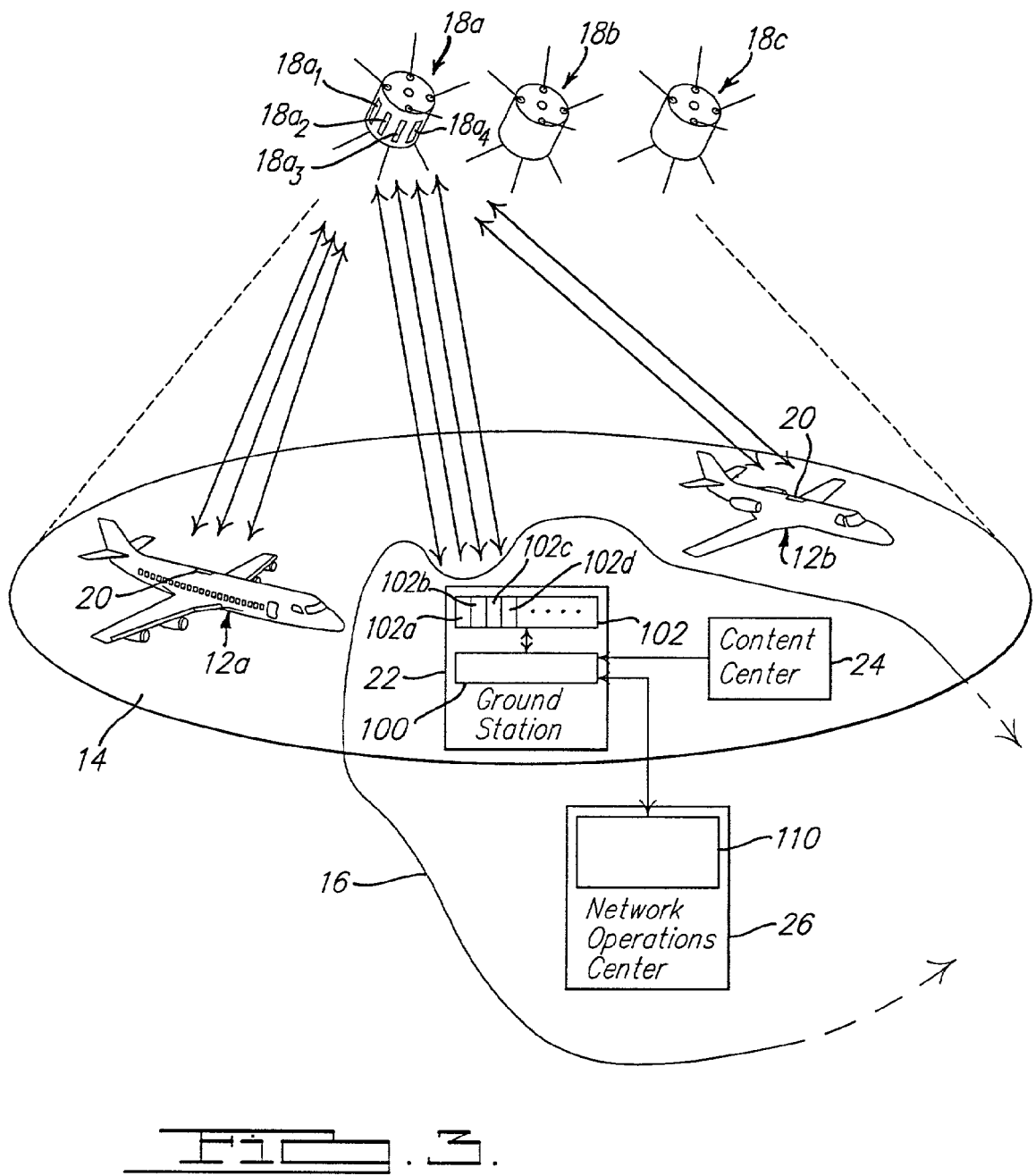
FIG. 3 is a simplified block diagram illustrating the system shown in FIG. 1 configured to provide data to a platform to which a plurality of transponders are assigned.

FIG. 3 illustrates several of the previously described ground facilities associated with a typical coverage region 14 in which mobile platforms 12a and 12b are traveling. The associated ground station 22 is served by a ground station router 100. The router 100 streams data packets received from the associated content center 24 to equipment chains 102 providing transponder feed via antenna to the satellites 18. Each equipment chain 102 is dedicated to one satellite 18 transponder. For example, as shown in FIG. 3, equipment chains 102a-d transmit respectively to transponders $18a_1$-$18a_4$. Although not shown in FIG. 3, additional equipment chains 102 can transmit data to other transponders on the satellites 18.

Each of the mobile platforms 12a and 12b is assigned to at least one transponder on the satellites 18a-b. For example, as shown in FIG. 3, the platform 12a is assigned to transponders $18a_1$, $18a_2$, and $18a_3$, and the platform 12b is assigned to transponders $18a_3$ and $18a_4$. Thus the platforms 12a and 12b can selectively tune to more than one satellite transponder. It can be desirable to provide more than one routing path to the platform 12a to support, for example, in-flight, periodic "pushed" cache refresh services as previously described.

Embodiments of a method for discovering a data path to a platform shall now be described. Generally, and referring to FIG. 3, the mobile platform 12a signals to the route server 110 those paths through which the platform 12a has determined that it is able to receive data, and the route server 110 then advertises the paths to the system network 10. A new network topology thus is defined for the system 10 that includes the subnet 20 on board the platform 12a and describes the subnet 20 as being accessible via the advertised paths.

For example, in one embodiment and referring to FIG. 3, in order to determine data paths, the mobile system 20 on the platform 12a refers to the transponders to which its receiver subsystems 66 are tuned. More specifically, the receive antenna 82 on the mobile platform 12a is tuned based on a transponder assignment table accessible by the antenna controller 86 that denotes assignment of the transponders $18a_1$, $18a_2$, and $18a_3$ to the platform 12a. If a receiver subsystem 66 is able to lock onto the signal of an assigned transponder via the receive antenna 82, the subsystem 20 on the platform 12a assumes that it can receive data via that transponder. When a return link is established with the ground segment 16, the mobile platform 12a communicates to the route server 110 those of transponders $18a_1$, $18a_2$, and $18a_3$ onto which its receivers 66 are locked. The route server 110 then advertises the locked transponder paths to the network 10.

It is possible, however, for data to be dropped or corrupted if a fault occurs downstream of the antenna tuning apparatus. Thus, in accordance with a preferred embodiment, the platform 12a communicates to the route server 110 the paths through which it actually receives data. More specifically, a unique path signature, e.g. a unique multicast address, is assigned to each of the equipment chains 102 feeding data to transponders on satellites 18.

A ground segment processor, for example, the ground station router 100, periodically multicasts messages containing the path signatures corresponding to the equipment chains 102. For example, the router 100 periodically multicasts a path signature message corresponding to the transponder equipment chain 102a. The multicast message is, for example, a User Datagram Protocol (UDP) packet that includes the equipment chain 102a multicast address as header information. A multicast message is a one-to-many message and generally is transmitted out of all router ports into which it has not been transmitted. Thus ground routers of the network 10 route a multicast message corresponding to equipment chain 102a to, and only to, the equipment chain 102a, from which the message is broadcast via the transponder $18a_1$. The platform 12a is a member of a group for receiving the chain 102a multicast and, if able to receive data from the equipment chain 102a, receives the multicast message.

The platform 12a then transmits, to the ground segment, the path signature for the chain 102a. More specifically, the platform 12a extracts the equipment chain 102a multicast address from the received path signature message and includes the address in a polling response that is transmitted to the ground segment 16. The route server 110 correlates the multicast address with the equipment chain 102a and advertises the chain 102a data path to the network 10. Thus the network is notified that the platform 12a can be accessed via equipment chain 102a.

Similarly, and referring to FIGS. 2 and 3, multicast messages corresponding to equipment chains 102b and 102c also are periodically multicast as described above with respect to chain 102a. The mobile platform 12a receives as many path signature multicast messages as it has operating receiver 66 paths to its on-board router 50. The router 50 on board the platform 12a extracts each of the multicast addresses from each of the received path signature messages and transmits the multicast addresses to the ground segment 16. The route server 110 correlates the multicast addresses to their corresponding equipment chains 102 and then advertises the operational paths to the network 10. The ground segment 16 sends path signature messages periodically, so that any path change can be detected and advertised to the network 10.

By providing for multiple path discovery, the system 10 components described above enable statistical multiplexing of unicast communications between a mobile platform 12 and the ground segment 16. Statistical multiplexing is performed in the following manner. When multiple users access a data pipe, their use aggregates into a peak and an average. As the number of users increases, the peak and average become closer together and more efficient use is made of the data pipe.

Efficiency of use increases as it becomes more likely that the user data requests will spread more evenly with time.

Since each transponder has a fixed maximum data rate based on a link budget for the system 10, a user pool can be increased by assigning multiple transponders to a mobile platform 12, thus resulting in a data pipe multiple times the capacity of a single transponder. For example, referring to FIG. 3, where the transponders $18a_1$, $18a_2$, and $18a_3$ are assigned to the platform 12a, the platform 12a can be included in three multicast groups, each of which is associated with equipment chains 102a, 102b and 102c respectively. Data requests by users on board the platform 12 then are spread over the multiple transponders, for example, by the ground station router 100 using advanced router standard route sharing features. The ground station router 100 hashes each individual user session among the multiple transponders to the same subnet address, that is, the subnet 20 on board the platform 12. Based on the path signatures returned by the platform 12 as described above, the router 100 distributes use of the aggregate transponder pipe among the transponders, thus resulting in statistical multiplexing.

The above described methods and apparatus provide for ground segment maintenance of information used to control path discovery for a coverage region. Thus the possibility of misrouting due to differences in transponder path identification by a mobile platform and by the ground segment is eliminated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for discovering a data routing path via satellite link to a mobile platform from a ground segment of a communications network wherein the mobile platform and the ground segment are configured to communicate via at least one of a plurality of satellite transponders, each transponder having a dedicated ground segment equipment chain, the method comprising the steps of:
    assigning a unique path signature to each of the plurality of transponder equipment chains to uniquely identify each chain;
    multicasting, by the ground segment via at least one of the transponder equipment chains, at least one message, each message containing the path signature corresponding to the transponder equipment chain through which the message is multicast; and
    the platform transmitting, to the ground segment, at least one path signature received by the platform via the at least one message.

2. The method of claim 1 further comprising the step of advertising a routing path associated with the at least one received path signature to the network, said step being performed by a route server.

3. The method of claim 2 wherein the step of advertising comprises correlating a received path signature to an associated equipment chain.

4. The method of claim 1 wherein the equipment chain path signature includes a multicast address to which the message is transmitted.

5. The method of claim 4 wherein the step of transmitting at least one path signature to the ground segment comprises the steps of:
    extracting a multicast address from a received path signature message;
    including the multicast address in a polling response; and
    transmitting the response to the ground segment.

6. The method of claim 1 wherein the multicasting step is performed periodically.

7. The method of claim 1, wherein the ground segment associates a plurality of data routing paths to the platform with a corresponding plurality of multicast addresses transmitted by the platform in a plurality of polling responses, the method further comprising hashing a unicast session between the platform and the ground segment among the transponders corresponding to the multicast addresses in the plurality of polling responses.

8. A method for discovering a data routing path via satellite link to a mobile platform from a ground segment of a communications network wherein the mobile platform and the ground segment are configured to communicate via at least one of a plurality of satellite transponders, each transponder having a dedicated ground segment equipment chain, the method comprising the steps of:
    assigning a unique multicast address to each of the plurality of transponder equipment chains to uniquely identify each chain;
    multicasting, by the ground segment via at least one of the equipment chains, at least one message to and including at least one of the multicast addresses; and
    the platform transmitting, in at least one polling response to the ground segment, at least one multicast address received by the platform via the at least one message from the at least one of the equipment chains.

9. The method of claim 8 further comprising the step of including the platform in at least one group for receiving the multicast messages.

10. The method of claim 8 further comprising the steps of:
    correlating a received one of the multicast addresses to its associated equipment chain; and
    a route server advertising, to the network, a routing path to the platform via the associated equipment chain.

11. The method of claim 8, wherein the ground segment associates a plurality of data routing paths to the platform with a corresponding plurality of multicast addresses transmitted by the platform in a plurality of polling responses, the method further comprising hashing a unicast session between the platform and the ground segment among the transponders corresponding to the multicast addresses in the plurality of polling responses.

12. The method of claim 8, further comprising the ground segment:
    performing the multicasting periodically to detect a path change; and
    discovering and advertising a new path based on polling responses by the platform to the periodic multicasting.

13. An apparatus for statistically multiplexing transponder use by a plurality of users on a mobile platform communicating via satellite link with a ground segment of a communications network, the apparatus comprising:
    a plurality of satellite transponders assigned to the platform for communication with the ground segment, each transponder comprising a dedicated ground segment equipment chain;
    at least one ground segment router configured to transmit a plurality of multicast messages via the equipment chains to the platform, each of the messages including a signature of a path corresponding to the equipment chain through which the message is multicast, the signature uniquely identifying the equipment chain through which the message is multicast;
    a route server configured to advertise, to the network, path signatures received and returned by the platform to the ground segment; and a ground segment router configured to distribute use of an aggregate transponder pipe among the transponders based on the path signatures returned by the platform.

14. The apparatus of claim 13 wherein each of the equipment chains comprises a unique multicast address.

15. The apparatus of claim 14 wherein the platform is included in a plurality of multicast groups, each of the groups associated with a corresponding one of the equipment chains.

16. The apparatus of claim 13 wherein the platform is configured to return the path signature in a polling response.

17. The apparatus of claim 13, wherein the ground segment router is further configured to hash a session of a user on the platform among the transponders.

18. A method for discovering a data routing path via satellite link to a mobile platform from a ground segment of a communications network wherein the mobile platform and the ground segment are configured to communicate via at least one of a plurality of satellite transponders, each transponder having a dedicated ground segment equipment chain, the method comprising the platform communicating, to the ground segment, each of the transponders onto a signal of which a receiver of the platform is locked and via which the platform receives data;

the communicating performed at least in part by the platform returning to the around segment one or more multicast addresses received by the platform in one or more multicast messages through one or more of the equipment chains, each of the messages identifying the equipment chain through which it is sent to the platform.

19. The method of claim 18 further comprising the step of tuning a receiver based on a platform transponder assignment table.

20. The method of claim 18 further comprising a route server advertising the locked transponder paths to the network.

* * * * *